United States Patent [19]

Maurice et al.

[11] Patent Number: 4,472,616
[45] Date of Patent: Sep. 18, 1984

[54] PROCESS AND APPARATUS TO OBTAIN HOMOGENEOUS TRANSVERSE HEATING BY ELECTROMAGNETIC INDUCTION OF CONTINUOUSLY PASSING LONG AND THIN PRODUCTS

[75] Inventors: Jean Maurice, Paris; Jean-Paul Camus, Mantes-La-Jolie; Roger Travers, Chatenay-Malabry, all of France

[73] Assignee: CEM Compagnie Electro Mecanique, Paris, France

[21] Appl. No.: 443,558

[22] Filed: Nov. 22, 1982

[30] Foreign Application Priority Data

Nov. 24, 1981 [FR] France ................... 81 21945

[51] Int. Cl.³ .............................................. H05B 6/10
[52] U.S. Cl. ........................ 219/10.43; 219/10.61 R; 219/10.79; 219/10.75; 219/10.49 R
[58] Field of Search ............... 219/10.61 R, 10.61 A, 219/10.49 R, 10.49 A, 10.41, 10.43, 10.75, 10.57, 10.79, 10.67, 10.71, 469, 470, 471

[56] References Cited

U.S. PATENT DOCUMENTS 2,832,877 4/1958 Dreyfus ..................... 219/10.79 X
3,444,346 5/1969 Russell et al. ................ 219/10.61 R
4,350,861 9/1982 Pouillange et al. .......... 219/10.61 R
4,425,489 1/1984 Pav et al. ..................... 219/10.49 A Primary Examiner—Roy N. Envall, Jr.
Assistant Examiner—Philip H. Leung
Attorney, Agent, or Firm—Burns, Doane, Swecker & Mathis

[57] ABSTRACT

Continuously moving, elongated, thin work products are subjected to homogeneous electromagnetic inductive heating in the transverse direction. The heating is achieved by an induction heating apparatus having a rotating inductor with a plurality of magnetic poles and an adjustable yoke. The inductor is rotatable about an axis and the work product is guided by a rotatable support in a loop path coaxial with the axis. The yoke includes at least two elements that are movable relative to one another to vary gap between the inductor and the yoke to thereby generate a traverse profile of the resultant moving magnetic field across the width of the work product. The magnetic field is uniform in the center zone of the work product, then at either edge of the work product, first increases and then subsequently decreases to a value below the uniform field with increasing distance away from the center zone.

24 Claims, 8 Drawing Figures

PROCESS AND APPARATUS TO OBTAIN HOMOGENEOUS TRANSVERSE HEATING BY ELECTROMAGNETIC INDUCTION OF CONTINUOUSLY PASSING LONG AND THIN PRODUCTS

BACKGROUND OF THE INVENTION

Field of the Invention

The invention concerns a process and an apparatus for the realization of said process to obtain the homogeneous transverse heating of long and thin, conducting products, passing continuously, in electromagnetic induction heating assemblies.

The invention particularly concerns an assembly in which heating is induced by a moving magnetic field, created by the rotation of a relatively constant magnetic field, with the work product in contact with a support drum having the same axis of rotation as the inductor assembly.

An apparatus of this type is known in the prior art wherein a rotating hollow support of a refractory material houses a rotor entrained by a motor, comprising several poles supplied with continuous current of alternating polarity between adjacent poles. The moving magnetic field is generated by rotation of the inductors entrained by a motor. A yoke is provided to insure the return of the flux around the loop formed by the product passing around the rotating support. An inlet and outlet roller are provided for the product. The rotating support and the work product are thus located in the space between the inductor rotor and the return yoke of the flux.

It should be noted that such an apparatus provides very efficient inductive heating and eliminates the need for installations to compensate for reactions due to the poor power factor of devices supplied with an alternating current.

If the transverse profile of the magnetic field is uniform over the entire width of the product to be heated, however, the surface power induced is constant over the width for a product of infinite width only. In the case of a product with a finite width, the closure of the induced currents generates a variation of the surface power induced, which is a function of the wave length of the sliding field (see the diagram of FIG. 1 of the drawings attached hereto of the magnetic induction B and the induced power P) and of the dimensions of the product.

Object and Brief Summary of the Invention

It is the object of the present invention to eliminate the disadvantages of a nonhomogeneous induced surface power resulting from the current closures at the edges of the work product passing through the moving magnetic field, and to produce a more homogeneous transverse heating of the work product.

The present invention concerns a process consisting of creating a moving magnetic field, which in transverse profile, is uniform in the center zone of the product and increasing and decreasing in its lateral zones. In particular, in a preferred mode of the process, the profile of the resultant magnetic field in the transverse direction may consist of a center zone of uniform values and two lateral zones approaching a semi-arc of a sinusoid having a wave length equal to the longitudinal wave length of the field (i.e. the wavelength of the field applied along the length of the product) and an amplitude double that of the center zone. The value of the field defined in this manner drops to a minimum at each edge of the product.

The process which is the object of the present invention consists of creating a variation of the space between the inductor and the return yoke of the magnetic flux, adaptable to different widths of the product, in order to obtain the transverse profile desired of the resultant magnetic field.

The invention further concerns an apparatus for the realization of the above described process and to obtain in a simple manner, the transverse homogeneity of heating desired for work products of widths and thickness varying within the range of production. The apparatus is characterized in that it comprises at least one return yoke element (by the edge of the work product under consideration) rendered mobile with respect to a stationary element of the yoke. The stationary element creates the uniform transverse profile of the magnetic field by which the variation of the space between the inductor and the yoke is determined.

One embodiment of the apparatus of the invention comprises a flux return yoke consisting of three elements:

the stationary element creating a uniform center zone of the transverse profile of the magnetic field; and two mobile elements of a special configuration to create the lateral zones of the magnetic field; said mobile elements sliding inside the stationary element by means of guides and jacks making it possible to position them with respect to the edges of the product to be heated.

According to another embodiment of the invention, the apparatus contains a yoke for the return of the magnetic flux divided into sections mobile in translation, the positioning whereof is effected by jacks to adapt it to different widths of the product.

According to another variant of embodiment, the sections rotate about an axis parallel though not colinear with the axis of rotation of the inductors.

BRIEF DESCRIPTION OF THE DRAWINGS

Further characteristics and advantages of the present invention will become apparent from the description hereinafter with reference to the drawings attached hereto, in which.

DETAILED DESCRIPTION

Figure 3:
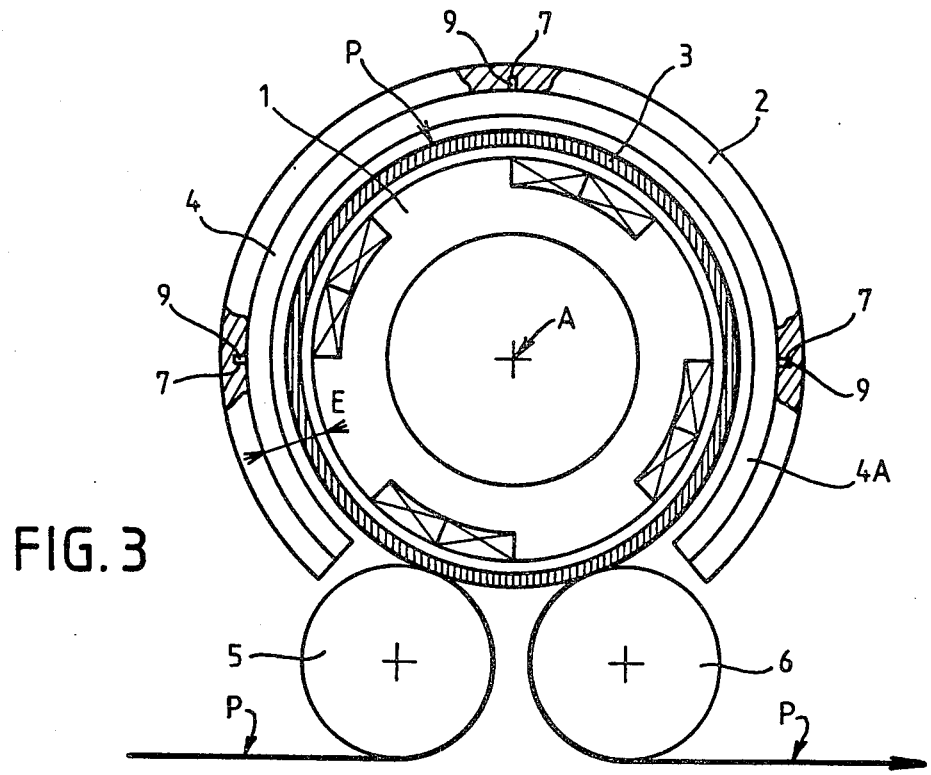
FIG. 3 is a view of a schematic elevation of a form of embodiment of a heating apparatus according to the invention.

The process according to the invention makes it possible to obtain a homogeneous transverse heating by magnetic induction of continuously moving long and thin work products. With reference to FIG. 3, the present invention concerns heating induced by a moving magnetic field created by a multipoled inductor assembly producing an invariable magnetic field by rotating about an axis A. The work product P moves on a rotating support 3, having the same axis of rotation as the multipoled inductor assembly, a yoke 2 insures the return of the flux around a loop formed by the product passing over the rotating support 3.

Figure 1:
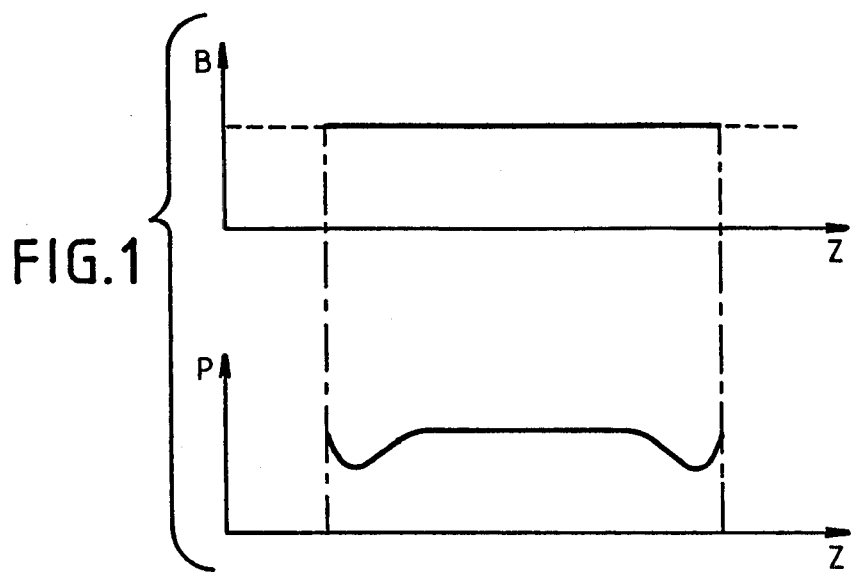
FIG. 1 shows two explanatory diagrams considered together for comprehension.
Figure 2:
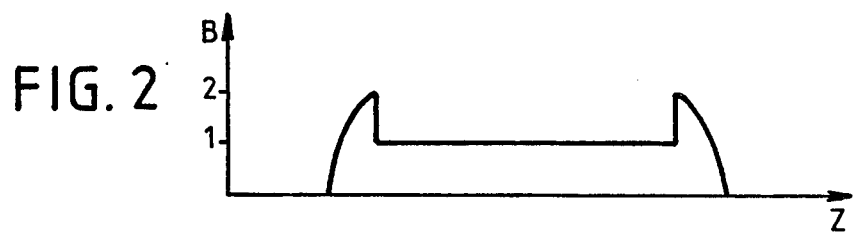
FIG. 2 is a diagram relating specifically to the invention.

The present invention involves a process for creating a resultant magnetic field sliding longitudinally, that is, in transverse profile, uniform in the center zone of the product and increasing and decreasing in the lateral zones, so as to obtain a resultant transverse profile, such as that shown in FIG. 2.

Referring to FIG. 2, the profile of the resultant magnetic field in the transverse direction consists of a center zone of a uniform value and two lateral zones of a configuration approaching a semi-arc quarter wavelength of a sinusoid having a wave length equal to the longitudinal wave length of said field and an amplitude double that of the center zone. These approximately sinusoidal complements may be obtained advantageously by a variation of the space between the inductor and the flux return yoke that is adaptable to different widths of the product.

Figure 4:
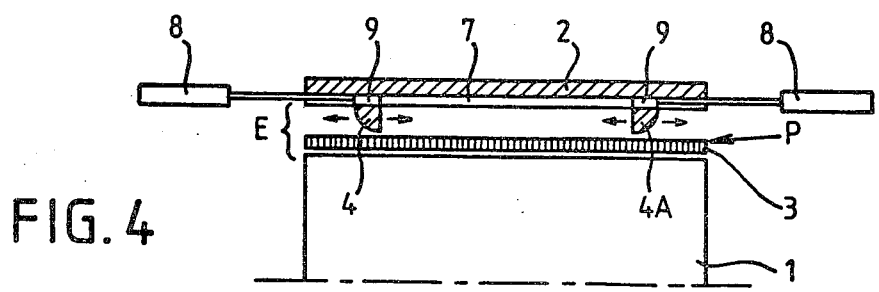
FIG. 4 is a view in partial cross section of said apparatus.

In the form of embodiment shown in FIGS. 3 and 4 of an electromagnetic induction heating apparatus according to the invention, the apparatus comprises a multipolar inductor rotor 1 and a stationary yoke element 2 separated by a space E. A rotating support 3 and two mobile elements of a yoke 4-4A are located in the space between the multipolar inductor, and the stationary yoke element 2.

As shown in FIGS. 3 and 4, one examplary embodiment of the mobile elements 4-4A of the yoke may each consist of an interrupted "C" shaped split ring of essentially triangular cross section with a curved base, having a cross sectional radial dimension approximately equal to one-half of the space E and a cross sectional base equal to one quarter of the wave length of the field moving at the level of the work product to be heated i.e. one-quarter of the wavelength of the resultant magnetic field applied to the work product, such wavelength being a function of the number of poles inductor and speed of rotation of the multipoled inductor in the illustrated embodiment. The work product is revolving around the rotating support while forming a loop from an inlet roller 5 to an outlet roller 6.

The mobile elements 4-4A slide parallel to the general axis of rotation, A, inside the stationary element 2 by means of a plurality of guides 7 and electric jacks 8 to position them with respect to the edges of the work product to be heated.

Thus, the mobile elements 4-4A may, in one embodiment, take the form of "C" shaped split rings with a triangular cross section placed opposite each other, the rings being equipped with runners 9 capable of sliding in the grooves of the guides 7. The rings constituting the mobile elements are interrupted over part of their circumference so as to provide a space for the placement of the rollers 5 and 6. The same is true for the element 2 of the yoke, which shows a longitudinal breech for the emplacement of the rollers.

Figure 5:
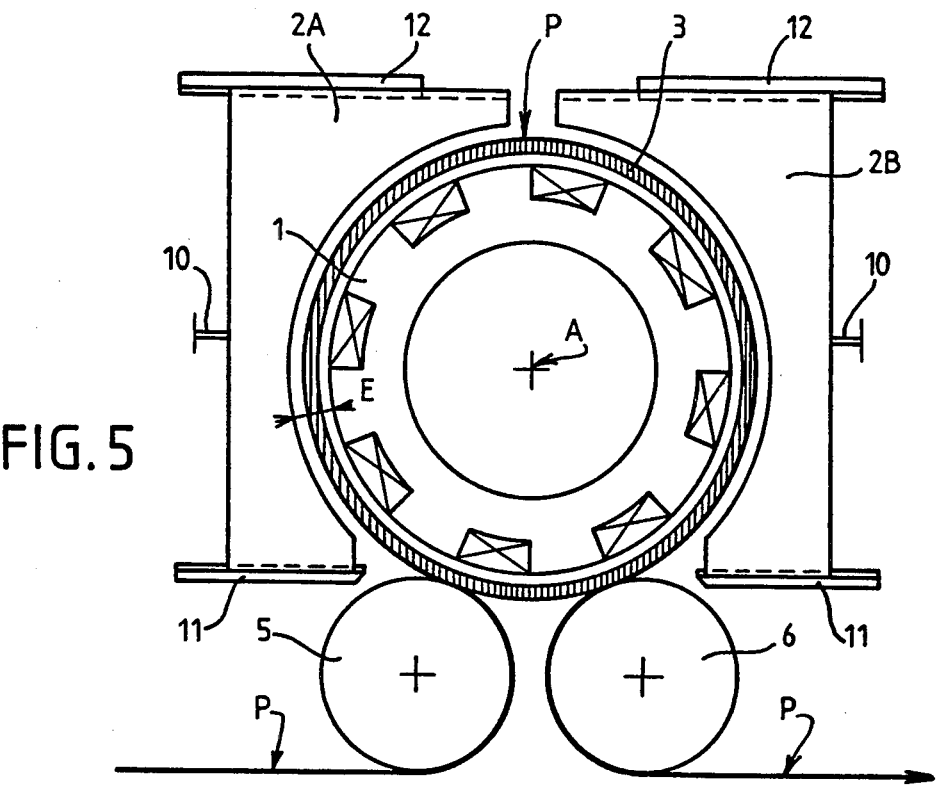
FIG. 5 is a view in elevation, schematically, of another form of embodiment of a heating apparatus according to the invention.
Figure 6:
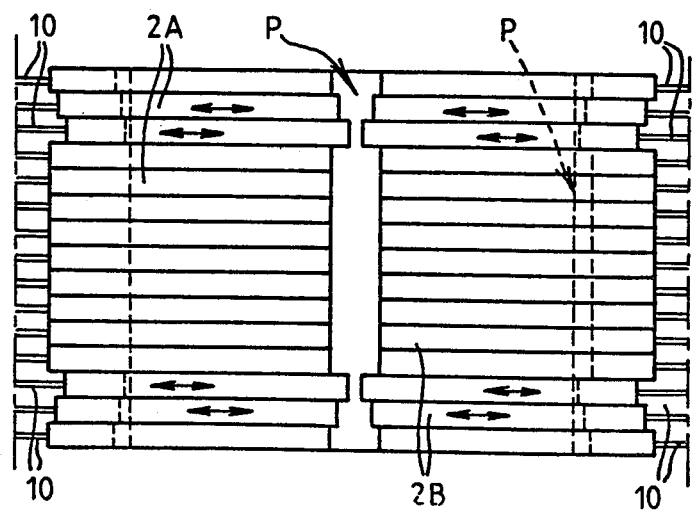
FIG. 6 is a top view of said form of embodiment.

In another form of embodiment shown in FIGS. 5 and 6, a multipolar inductor rotor 1 is found, together with a rotating support 3, an inlet roller 5 and an outlet roller 6. In this embodiment the magnetic flux return yoke comprises the sections 2A-2B mobile in translation perpendicular to the general axis of rotation A. The positioning of the magnetic flux return yoke sections 2A-2B is obtained by means of electric jacks 10 (shown partially for the sake of clarity of the drawing), in order to adapt the sections 2A-2B to different widths of the product.

There are actually two groups of mobile sections (facing each other); a group of sections 2A and a group of sections 2B. Each section has essentially a rectangular geometry with a "C" shaped cutout oriented so that the "C" shaped cutouts of two individually opposing sections of groups 2A and 2B open toward and surround the inductor rotor 1, the rotating support 3 and the work product P. Each section may be displaced by a set of two guides; a lower guide 11 and an upper guide 12.

Figure 7:
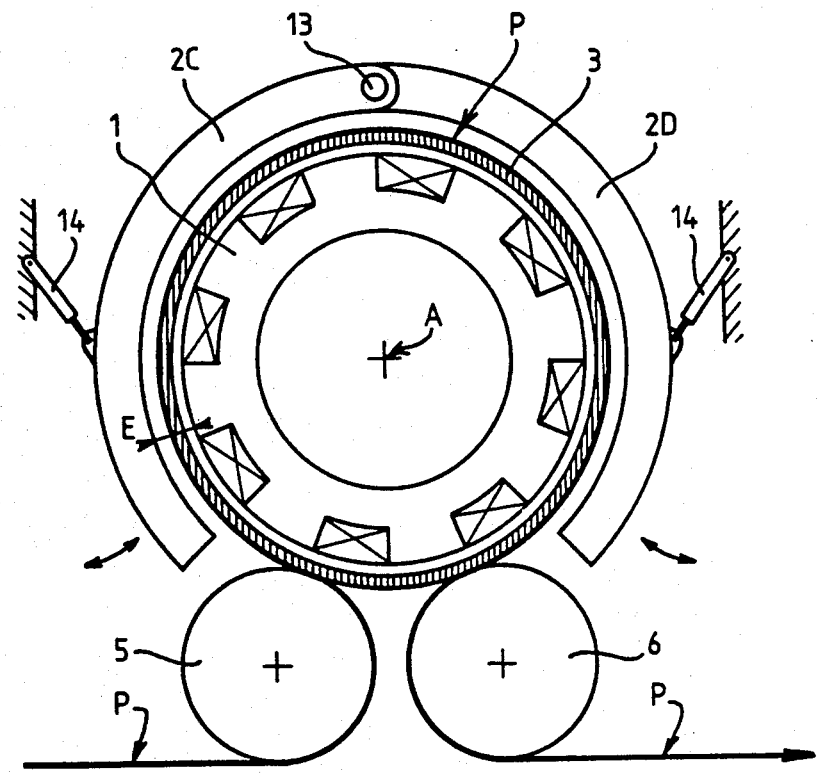
FIG. 7 is a view of a schematic elevation of another variant of the heating apparatus according to the invention.
Figure 8:
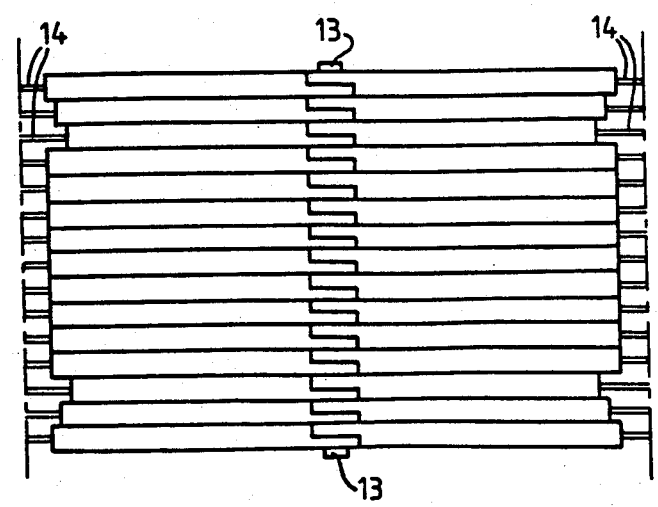
FIG. 8 is a top view of said apparatus.

In the form of embodiment shown in FIGS. 7 and 8, one finds a multipolar inductor rotor 1, a rotating support 3, an input roller 5 and an output roller 6. In this form of embodiment, the magnetic flux return yoke contains the sections 2C-2D rotating about a common axis of rotation 13 parallel to the general axis of rotation A. Their positioning is obtained by means of a plurality of electric jacks 14. Each section of the group of sections 2C and 2D has an essentially "C" shaped geometry with a gap opening facing an opposing section of the other group. Taken together, as shown in FIG. 7, the two groups of sections 2C and 2D surround the inductor rotor 1, the rotating support 3, and the product P. The axle 13 suffices to support all of the sections while permitting them to rotate.

It should be understood, finally, that the present invention has been described and illustrated merely as a preferred example and that equivalent component elements may be employed without exceeding the scope of the invention.

What is claimed is:

1. Process for obtaining homogeneous heating in the transverse direction by electromagnetic inductive heating of continuously moving, elongated, thin conductive work products comprising the steps of creating a moving magnetic field by rotation of a relatively constant magnetic field about an axis, moving the work product on a rotating support having the same axis of rotation as the constant magnetic field, providing a yoke ensuring the return of the flux of the moving magnetic field around a loop formed by the work product passing over the rotating support, generating a transverse profile of the resultant magnetic field across the width of the product which is uniform in the center zone of the work product, then at either edge of the work product, first increases and then subsequently decreases to a value below the uniform field with increasing distance away from the center zone by means of the variation of a gap between a series of inductors generating the moving magnetic field and the magnetic flux return yoke, the variation of the gap being adjustable to accommodate different widths of the work product.

2. Process as defined in claim 1 wherein the moving magnetic field in transverse profile across the width of the work product is of uniform value in the center of the work product with two lateral zones of a configuration resembling the semi-arc of a sinusoid wave having a wave length equal to the longitudinal wave length of the moving magnetic field and an amplitude twice that of the center zone of the magnetic field.

3. Apparatus for obtaining homogeneous electromagnetic inductive heating in the transverse direction of continuously moving, elongated, thin work products, comprising:
  an inductor with a plurality of magnetic poles of alternating polarity for generating a relatively constant magnetic field, said inductor being rotatable about an axis;
  a rotatable support for guiding the work product in a loop path coaxial with said axis; and
  a yoke for ensuring the return of magnetic flux around said loop, said yoke including at least two elements that are movable relative to one another to vary a gap between said inductor and said yoke to thereby generate a transverse profile of the resultant moving magnetic field across the width of the work product which is uniform in the center zone of the work product, then at either edge of the work product, first increases and then subsequently decreases to a value below the uniform field with increasing distance away from the center zone, and is adjustable to accommodate different widths of the work product.

4. Apparatus according to claim 3 wherein the movable elements of the yoke are adjustable so as to obtain a moving magnetic field that is, in transverse profile, uniform in the center zone of the work product with two edge zones of a configuration approaching the semi-arc of a sinusoid wave having a wave length equal to the longitudinal wave length of the moving magnetic field and an amplitude equal to twice the intensity of the magnetic field at the center of the work product.

5. Apparatus according to claim 4 wherein at least one element of the yoke moves parallel to the axis of rotation of the inductor generating the moving magnetic field.

6. Apparatus according to claim 5 wherein the mobile yoke elements are approximately located at the lateral edges of the work product to be heated, having a cross-sectional geometry of a triangle with a curved base, the radial cross-sectional dimension being equal to approximately one-half of the distance between a stationary yoke element and the multipoled inductors generating the moving magnetic field, the cross-sectional base being equal to one-fourth of the wavelength of the magnetic field at the level of the work product.

7. Apparatus according to claim 4 wherein a plurality of mobile yoke elements move perpendicular to the axis of rotation of the inductor generating the moving magnetic field.

8. Apparatus according to claim 7 wherein two opposing groups of magnetic flux return yokes are composed of a plurality of individual sections each having an essentially rectangular geometry with a C-shaped cutout oriented so that the C-shaped cutouts of each opposing yoke section surround and open toward said inductor, said rotating support, and a work product to be heated, with positioning of the individual sections of the magnetic flux return being effected by means of jacks so as to vary the gap between the work product and the magnetic flux return yokes to adapt to differing widths of work products.

9. Apparatus according to claim 8 wherein each individual section of the group of magnetic flux return yokes is guided by a set of slide guides.

10. Apparatus according to claim 7 wherein two groups of mobile magnetic flux return yokes are composed of a plurality of individual elements, each having an essentially C-shaped geometry oriented so that the openings of the individual sections of the opposing groups of magnetic flux return yokes open toward and face one another so as to surround said multipoled inductor, said rotating support, and a work product to be heated, the magnetic flux return yokes pivot in a plane perpendicular to the axis of rotation of the inductor generating the moving magnetic field, pivoting angularly about one of their ends around a common axis of rotation parallel to the axis of rotation of the series of inductor poles.

11. Apparatus according to claim 10 further including jacks for positioning the individual elements of the mobile flux return yokes.

12. Apparatus according to claim 4 wherein at least one mobile yoke elements slide inside a stationary yoke element by means of guides set in the stationary yoke element parallel to the axis of rotation of the magnetic inductor generating the moving magnetic field with jacks positioning the mobile elements of the yoke with respect to the edges of the work product to be heated.

13. Apparatus according to claim 12 wherein the mobile yoke elements are approximately located at the lateral edges of the work product to be heated, having a cross-sectional geometry of a triangle with a curved base, the radial cross-sectional dimension being equal to approximately one-half of the distance between the stationary yoke element and the multipoled inductor generating the moving magnetic field, the cross-sectional base being equal to one-fourth of the wavelength of the magnetic field at the level of the work product.

14. Apparatus according to claim 13 wherein the mobile yoke elements are equipped with runners capable of sliding in the guides set in the stationary yoke element.

15. Apparatus according to claim 3 wherein at least one element of the yoke moves parallel to the axis of rotation of the inductor generating the moving magnetic field.

16. Apparatus according to claim 15 wherein the mobile yoke elements are approximately located at the lateral edges of the work product to be heated, and have a cross-sectional geometry of a triangle with a curved base, the radial cross-sectional dimension being equal to approximately one-half of the distance between a stationary yoke element and the multipoled inductor generating the moving magnetic field, the cross-sectional base being equal to one-fourth of the wave length of the magnetic field at the level of the work product.

17. Apparatus according to claim 3 wherein a plurality of mobile yoke elements move perpendicular to the axis of rotation of the inductor generating the moving magnetic field.

18. Apparatus according to claim 17 wherein two opposing groups of magnetic flux return yokes are composed of a plurality of individual sections each having an essentially rectangular geometry with a C-shaped cutout oriented so that the C-shaped cutouts of each opposing yoke section surround and open toward said multipoled inductor, said rotating support, and a work product to be heated, with positioning of the individual sections of the magnetic flux return being effected by means of jacks so as to vary the gap between the work product and the magnetic flux return yokes to adapt to differing widths of work products.

19. Apparatus according to claim 18 wherein each individual section of the group of magnetic flux return yokes is guided by a set of slide guides.

20. Apparatus according to claim 17 wherein two groups of mobile magnetic flux return yokes are composed of a plurality of individual elements, each having an essentially C-shaped geometry oriented so that the openings of the individual sections of the opposing groups of magnetic flux return yokes open toward and face one another so as to surround said multipoled inductor, said rotating support, and a work product to be heated, the magnetic flux return yokes pivot in a plane perpendicular to the axis of rotation of the inductor generating the moving magnetic field, pivoting angularly about one of their ends around a common axis of rotation parallel to the axis of rotation of the series of inductor poles.

21. Apparatus according to claim 20 further including jacks for positioning individual elements of the mobile flux return yokes.

22. Apparatus according to claim 3 wherein at least one mobile yoke elements slide inside a stationary yoke element by means of guides set in the stationary yoke element parallel to the axis of rotation of the magnetic inductor generating the moving magnetic field with jacks positioning the mobile elements of the yoke with respect to the edges of the work products to be heated.

23. Apparatus according to claim 22 wherein the mobile yoke elements are approximately located at the lateral edges of the work product to be heated, having a cross-sectional geometry of a triangle with a curved base, the radial cross-sectional dimension being equal to approximately one-half of the distance between the stationary yoke element and the multipoled inductor generating the moving magnetic field, the cross-sectional base being equal to one-fourth of the wavelength of the magnetic field at the level of the work product.

24. Apparatus according to claim 23 wherein the mobile yoke elements are equipped with runners capable of sliding in the guides set in the stationary yoke element.

* * * * *